3,043,782
PROCESS FOR PREPARING A MORE IMPERMEABLE COATING BY LIQUID-LIQUID PHASE SEPARATION
Erik H. Jensen, Kalamazoo Township, Kalamazoo County, Mich., assignor to The Upjohn Company, Kalamazoo, Mich., a corporation of Delaware
No Drawing. Filed Dec. 22, 1958, Ser. No. 781,933
3 Claims. (Cl. 252—316)

This invention relates to a method for improving liquid-liquid phase separation coatings. More particularly, it relates to an improvement in the step of drying the coated material produced by such a procedure.

Liquid-liquid phase separation procedures such as coacervation are becoming increasingly important as a means for providing protective coatings for particulate materials. Obviously, the relative permeability or impermeability of such coatings is very important.

It has now been found that one of the critical conditions for controlling permeability involves the pH at which spray drying of particles coated by phase separation techniques is carried out. By controlling the pH of spray drying a much more impermeable coating can be obtained.

Thus, in the process of preparing a more impermeable coating with a gelable hydrophilic colloid by liquid-liquid phase separation, the present improvement relates to the step of spray-drying after adjusting the pH of the liquid containing the dispersed coated materials to between about 4 and about 6. Although the reason for the phenomenon is unknown, experimental results unexpectedly indicate optimum results are obtained within the pH range indicated. If the drying step is carried out at a pH substantially above 6, the coating is too permeable for many purposes for which the protection coatings are desired as will be shown hereinafter. The type of spray dryer used or the particular conditions of spray drying (e.g., air temperature, type of nozzle and air flow) are not particularly critical for present purposes. They are merely adjusted in accordance with the requirements of the materials used in the process.

The product produced by the improved process of this invention is valuable as an article of manufacture wherever a relatively impermeable coating is desired. Such a coating is especially useful where either the coated material has penetrating properties or the environment to which the coated material is to be exposed has penetrating properties. For example, the instant produce can be employed in the printing art in the same manner as the products described in U.S. Patents 2,800,457 and 2,800,458 where a pressure sensitive, reproducing film to replace carbon paper is desired whenever a more penetrating material (e.g., a dye) is encapsulated or the finished product must withstand more rigorous handling and exposure conditions. It can be used to store otherwise incompatible mixtures where either the coated or uncoated material involved is a penetrating liquid. The present improvement also finds usefulness in coating oil products, such as vitamins or edible vegetable, animal, or mineral fats and oils. Such products are therefore suitable for incorporation into dry cereals, margarine, ice cream, butter, milk and other dairy products, fruit and vegetable juices (e.g., orange juice), bread and other baked goods, jams and other condiments, and for maintaining unstable flavors, the mantle being broken in cooking or mixing.

The encapsulated material can thus include medicaments and dietary supplements which must be maintained in fluid form over long periods of time or in more penetrating fluids for relatively short periods of time. The present improvement also provides improved coatings for orally ingestible materials which must resist immediate disintegration in certain environmental conditions existing in the gastrointestinal tract and thereby mask flavors or odors or provide sustained or controlled release.

Liquid-liquid phase separation as employed herein refers to the separation of a colloidal concentrate or colloid-rich phase from an original single-phase solution or sol, leaving behind a colloid-poor phase or equilibrium liquid. Thus, the separating phase is a liquid highly concentrated with respect to the colloid and dispersed in a liquid medium which is less concentrated with respect to the colloid. Where the separating phase consists of a single colloid, the process is termed simple phase separation; where more than one colloid is present, the process is called complex phase separation. In the usual system, the separating phase appears initially as a fine dispersion of microscopic droplets of colloid in the equilibrium liquid. When formed in a pure colloidal system, these droplets are essentially homogeneous. However, if foreign materials are present in the original sol or solution, the separating phase tends to form around these particles.

In order to obtain the maximum advantages of such a coating as a means for enhancing the usefulness of a wide variety of materials, it is necessary that the said coating or membrane retain its integrity except under conditions where release of the encapsulated material is desired. This means that the coating must have sufficient integrity to withstand normal usage in formulation and packaging. The coating must also remain intact under all contemplated environmental conditions until an appropriate physical, chemical or mechanical agency of destruction is operative. In addition to resisting premature destruction, the coating must be highly impermeable to the passage of molecules or ions which might adversely affect the encapsulated material. Alternatively, where slow release of materials enclosed within the coating membrane is desired, the coating structure must be of such permeability as to permit the gradual passage of environmental fluids to effect such release. Preparation of the membrane by the method of this invention yields a novel coating structure by which the foregoing properties can be obtained.

It is to be understood that the present method is operative regardless of the method by which the separating phase is deposited or precipitated, except that the said separating phase must contain as one of its components a gelable hydrophilic colloid. It is therefore the presence of the said colloid, and not the method by which its separation was effected or the additional presence of other colloids or polymers in the separating phase, which determines the limits of the applicability of the process described herein. Examples of suitable gelable hydrophilic colloid materials include gelatin, albimin, fibrinogen, casein, agar-agar, pectin, ichthyocolla, and the like. Other materials which can be used in combination with such gelable hydrophilic colloids include partially or completely hydrolyzed styrene maleic anhydride copolymer, gum acacia, sodium carboxymethylcellulose, sodium alignate, cellulose acetate phthalate, starch acetate phthalate, amylose acetate phthalate and other materials which are opposite in charge to the gelable hydrophilic colloid used.

Since such hydrophilic colloids are generally soluble in water, the present improvement is most advantageously used where the colloid phase separates from aqueous media. However, it is also possible to utilize the present drying improvement for phase separations from non-aqueous media.

Generally speaking, the improvement can be utilized in conjunction with other recent developments in liquid-liquid phase separation techniques for coating almost any type of particle, whether lipophilic or hydrophilic in its surface characteristics. The particles can be liquid or solid in physical structure. The liquid particles can be homogeneous or can contain dissolved material, dispersed emulsion particles, or other compatible materials. The solid particles can be untreated or can be precoated by phase separation techniques or any other suitable method.

Illustrative of the phase separation (e.g., coacervation) processes which yield coating membranes susceptible of improvement in permeability characteristics are the methods disclosed in U.S. Patent Nos. 2,800,457 and 2,800,458. The said patents describe encapsulation of microscopic oil droplets which can contain dissolved or suspended materials by simple and complex phase separation.

In accord with the disclosures of the aforesaid patents phase separation is induced, for example, by the addition of a salt in the case of simple phase separation and by the addition of excess solvent (i.e., water) in the case of complex phase separation. In the preferred embodiment of the present invention the addition of such phase separation inducing agents are spread out over a period of no less than about one-half hour or more than two hours. Salts which are suitable for inducing simple phase separation include salts having metal, e.g., alkaline earth and alkali-metal, magnesium, ammonium, potassium and lithium cations and organic or inorganic anions, e.g., sulfate, phosphate, citrate, acetate, formate, chloride, bromide, nitrate, thiocyanate, and iodide anions. The magnesium cation is ordinarily more efficacious than the lithium cation and the sulfate anion is ordinarily more efficacious than the iodide anion. The anion exerts a more profound influence on the efficacy of the salt than does the cation. Sodium sulfate and ammonium sulfate are highly efficacious for present purposes. The salt should be added in amounts sufficient to produce a significant percentage thereof by weight per volume of the resulting mixture, e.g., 1 to 50% and preferably 3 to 20%.

Similarly, simple phase separation to enclose small droplets of hydrophilic liquid-in-oil emulsions can be carried out in conjunction with the present method. The term hydrophilic liquid includes water, aqueous solutions or suspensions, and non-aqueous solutions or suspensions immiscible in the oil phase of the said emulsions. In preparing encapsulated droplets of this type, an anti-inversion agent, such as hydrogenated castor oil, capable of preventing the inversion of the liquid-in-oil emulsion to an oil-in-hydrophilic liquid emulsion is incorporated in the oil phase of the initial or primary emulsion. Suitable anti-inversion agents include surface active agents, preferably those of the nonionic type, and thickening agents such as the natural and synthetic waxes, solid fats, sterols, and other conventional oil-gelling or oil-thickening agents. Advantageously, the internal phase of the said emulsions can contain thickening agents, such as methyl cellulose, for increasing the viscosity of the said internal phase and thereby reducing the escaping tendency of ingredients dissolved or suspended therein. Agents employed for this purpose include the gelable hydrophilic colloids and other viscosity-increasing materials substantially insoluble in the oil phase. The thus prepared emulsion is dispersed in an aqueous sol of a gelable hydrophilic colloid, such as gelatin, at a temperature above the gel point of the said colloid to form a double emulsion. To this is added an aqueous solution of a separation inducing agent, such as sodium sulfate, to bring about phase separation. In this case, the inter-mixture of the emulsion containing colloid solution with the salt solution is carried out over a period of between about one-half to about two hours.

The method of this invention is likewise applicable to the treatment of complex phase separations enclosing hydrophilic liquid-in-oil emulsions as above defined wherein the separating phase includes as a component at least one gelable hydrophilic colloid, such as gelatin, and at least one linear macromolecular synthetic polymer, such as styrene-maleic acid copolymer. In phase separations of this type, a primary hydrophilic liquid-in-oil emulsion containing an anti-inversion agent is prepared as above, and the said primary emulsion is dispersed in an aqueous sol of the aforesaid colloids to form a double emulsion. The pH of the said double emulsion is then adjusted to the separation range of the particular colloids involved, thereby causing a coating to form about the particles of the said secondary emulsion, as above. In this case, pH adjustment is carried out over a period of between about one-half to about two hours.

The present method is equally applicable to the treatment of membranes enclosing oil-in-hydrophilic liquid emulsions by liquid phase separation. Such emulsions are prepared by the techniques of simple and complex phase separation alluded to above, except that the hydrophilic liquid phase must be rendered incompatible with aqueous media which it encounters in the course of phase separation, i.e., aqueous solutions of separation inducing agents and aqueous sols or solutions of the separating colloids, or other materials tending to disturb the integrity of the hydrophilic liquid phase of the initial emulsion. Such integrity is obtained by the addition of certain thickening agents, such as methyl cellulose, to the hydrophilic liquid phase. Phase separation is induced essentially as above over the period of time indicated.

Phase separation coatings produced by the procedures as generally outlined above but in which phase separation is induced by dilution with a non-solvent in which the colloid is less soluble than it is in water are also improved by the drying technique of the present invention.

An improved coating is likewise obtainable by the present process where the phase separation coating encloses solid particulate matter to which, if not already lipophilic in charatcer, a solid lipophilic coating, such as beeswax, has been applied prior to coating by liquid-liquid phase separation.

From the foregoing it is to be understood that the present invention is not limited in its applicability to coacervate membranes deposited by any particular method or comprising any particular combination of coacervating components, with the single limitation before noted, i.e., the use of a gelable hydrophilic colloid.

After the separating phase has collected around the dispersed particles, in a liquid form, it can be gelled and/or hardened by conventional techniques as desired. For example, gelling can be brought about by lowering the temperature below the gel point of the gelable component of the coacervate. Illustratively, chemical hardening can be carried out through the use of one or more of several hardening agents including formaldehyde, a dicarbonyl compound (e.g., glyoxal, 2-oxopropionaldehyde, 2,3-pentanedione, 3,4-hexanedione, and the like), tannic acid (alone or in combination with ferric chloride), and alum (having the formula $M'M'''(S)_2 \cdot 12H_2O$ wherein $M'$ is a monovalent metal, $M'''$ is a trivalent metal, and $S$ is a radical selected from the group consisting of sulfate and selenate).

Subsequent to treatment of the coating as desired, the pH of the equilibrium liquid containing the coated particles can be adjusted to the desired range before spray drying; or the coated particles can be separated from the equilibrium liquid by conventional means and dispersed in water, the pH of the dispersion being adjusted to the desired range before spray drying. After drying, the product of the invention generally resembles a dry powder.

The following examples are illustrative of the process improvement of the present invention but are not to be construed as limiting.

Example 1

A suspension of 8 gm. of methyl cellulose and 50 gm. of caffeine in 100 ml. of water is heated to 80° C. One hundred milliliters of mineral oil is heated to 80° C. and emulsified into the aqueous suspension. Seventy-five grams of styrene-maleic acid copolymer is dispersed in 1500 ml. of water, heated to 80° C., and sufficient 10% sodium hydroxide is added to dissolve the copolymer. The emulsion is then dispersed in the copolymer sol with agitation. Seventy-five grams of gelatin is dispersed in 500 ml. of water, heated to 80° C., and 10% sodium hydroxide is added to raise the pH to 7. The gelatin sol is then added dropwise to the emulsion-copolymer mixture with continuous stirring. Immediately thereafter is added dropwise over the period of one hour a sufficient amount of 20% acetic acid solution to bring the pH of the mixture down to 3.9. The material is maintained at 80° C. for 15 min., then cooled to 4° C. over a period of 30 min. To harden the separated phase, 75 ml. of 37% formaldehyde solution is added, followed by the dropwise addition of 10% sodium hydroxide to bring the pH up to 8. The hardened material is then separated by centrifugation, washed with water, dispersed in water adjusted to a pH of 5 by 20% acetic acid, and spray dried in a Niro spray dryer having centrifugal atomizer rotating at 35,000 r.p.m. and a controlled air flow. The inlet air temperature is adjusted to 140° C. and the exhaust air to 90° C. to produce a sustained action oral stimulant.

Other thickening agents can be substituted for the methyl cellulose above in equal amounts, such as, for example, acacia, tragacanth, carboxymethylcellulose, magnesium aluminum silicate, the polyglycols, glycerin, syrups and the like.

Similarly, other hydrophilic colloids such as agar-agar, albumin, fibrinogen, and the like, together with other synthetic polymers such as styrene-maleic acid amide, the sulfonated polystyrenes, starch acetate phthalate, cellulose acetate phthalate, amylose acetate phthalate, polymethacrylic acid, and methylvinyl ether-maleic acid substituted for the styrene-maleic acid above.

*Example 2*

A water-in-oil emulsion is prepared at 40° C. by emulsifying into 37 gm. of lanolin containing 0.25 gm. of polyoxyethylene sorbitan monostearate 30 ml. of water in which is dissolved 0.01 gm. of sulfanilamide. A sol comprising 15 gm. of fibrinogen in 150 ml. of water is heated to 40° C. and thoroughly mixed with the said emulsion. To the resulting mixture is introduced slowly 150 ml. of a 20% solution of sodium sulfate over the period of one and one-half hours with vigorous stirring. The temperature of the resulting equilibrium liquid containing the phase-coated emulsion is reduced to 7° C. to gel the fibrinogen. Sufficient 15% sodium carbonate solution is added to bring the ph to 8.5, and 5 ml. of a 10% solution of 2,3-butanedione, previously adjusted to pH 8.5, is added to harden the membrane. A hardening time of 30 minutes is permitted. The pH is adjusted to 4 by the addition of 10% HCl. The resulting coated particles are washed with water and spray dried in a Niro spray dryer as described in Example 1. The coated particles thus prepared can be incorporated in an ointment in the usual manner for topical use.

*Example 3*

Ten grams of glyceryl monostearate is melted by heating to 60° C., and 20 gm. of mercuric oxide is dispersed therein. A solution of 6 gm. of acacia in 48 ml. of water is prepared and heated to 60° C. The resulting solution is adjusted to pH 3.9 by the addition of 20% acetic acid solution. A gelatin sol is prepared by dispersing 6 gm. of gelatin in 48 ml. of water. The resulting sol is adjusted to pH 3.9 by addition of 20% acetic acid solution. Each of the above three fractions is heated to 60° C. With vigorous stirring, the mercuric oxide-glyceryl monostearate mixture is dispersed in the acacia solution and, stirring being continued, the gelatin sol is slowly added thereto. Approximately 90 ml. of water also heated to 60° C. is added dropwise to the resulting mixture over a period of 30 minutes to produce a phase coating about the particles of glyceryl monostearate which in turn envelopes the particles of mercuric oxide. When addition of the 90 ml. quantity of water is complete, the temperature is maintained at 60° C. for an additional 15 minutes followed by rapid cooling to 5° C. by the addition of 70 gm. of ice and 500 ml. of water at 0° C. The resulting mixture is maintained below 5° C. for two and one-half hours, after which time the pH is adjusted to 4. Thereafter, 300 ml. of a 10% solution of potassium manganic sulfate of pH 4 is added slowly to the above mixture, which is then maintained at 5° C. for 2 hours and then heated to room temperature. The thus treated coated mercuric oxide particles are separated by centrifugation and washed with water. The pH is rechecked and adjusted back to 4 if necessary and then the mixture is dried on a Niro spray dryer as described in Example 1 to produce an orally effective veterinary anthelmintic.

*Example 4*

| | | |
|---|---|---|
| Chloral hydrate | gm | 100 |
| Mineral oil | ml | 125 |
| Beeswax | gm | 25 |
| Styrene-maleic acid copolymer | gm | 75 |
| Gelatin | gm | 75 |

Dissolve 100 gm. of chloral hydrate in 50 ml. of water and heat to 70° C. Dissolve 25 gm. of beeswax in 125 ml. of mineral oil at 70° C. Emulsify the aqueous solution into the oil solution by passing the combined mixture through a hand homogenizer 4 times. Disperse 75 gm. of styrene-maleic acid copolymer in 1500 ml. of water, heat to 70° C. and add sufficient 10% sodium hydroxide to dissolve the copolymer. (At this point the copolymer solution has a pH between 7 and 8.) With continuous agitation, disperse the emulsion in the copolymer sol. Dissolve 75 gm. of gelatin in 500 ml. of water at 70° C. and add 10% sodium hydroxide to raise the pH of the sol to 7. Add the gelatin sol dropwise to the copolymer-emulsion mixture with continuous stirring. Immediately theerafter, with the temperature at 70° C. and with continuous stirring, add dropwise over the period of two hours 20% acetic acid solution to bring the pH of the mixture down to 4.5. Maintain the mixture at 70° C. with stirring for 30 minutes, and then cool to 6° C. over a period of 30 minutes. Maintain the material below 10° C. for 1 hour. Add a solution of 0.8 gm. tannic acid in 1000 ml. of water, with stirring, and after 30 minutes the treated coacervate is washed with water. The pH is checked and readjusted to 4.5 if necessary and dried in a Niro spray dryer as described in Example 1 to produce a sustained action sedative.

*Example 5*

Crystal violet lactone having the formula 3,3-bis(p-dimethylaminophenyl)6-dimethylamino phthalide is dissolved to the extent of 3% by weight in trichlorodiphenyl. One gallon oil-in-water emulsion containing 20 parts by weight of the trichlorodiphenyl and 100 parts by weight of a sol of 10% by weight of pigskin gelatin having an iso-electric point at pH 8 in water is prepared. Emulsification is continued until the drop size of the oil is from 2 to 5 microns. This material is kept at 50° C. to keep the gelatin from gelling. With the temperature kept at 50° C., phase separation is induced by adding slowly and uniformly, four-tenths of a gallon of sodium sulfate in water over the period of one hour with continuous agitation. The gelatin molecules are thus deposited uniformly about each oil droplet as a nucleus. The heated mixture is then poured into 10 gallons of 7% by weight of sodium sulfate in water at 4° C. with agitation to gel the gelatin. The material is filtered and washed with water while the temperature is kept below the gel point of the gelatin to remove the salt. The filtered material is hardened by combining it under alkaline conditions with 2 gallons of a 37% solution of formaldehyde in water. This hardened mass is then filtered and washed to remove the residual formaldehyde. The resulting filter cake is adjusted to the proper water content and a pH of 6 by the addition of 5% HCl and dried in a Niro spray dryer as described in Example 1. The material is ready for application to a sheet of paper which is then dried to form a transfer film. When marking pressures break the capsules and release the oil, it contacts a sensitized undersheet containing attapulgite and transfers the markings to the undersheet as desired.

*Example 6*

A sol is made of 20 grams of gum acacia dissolved in 160 grams of water. Into this is emulsified 80 grams of trichlorodiphenyl. A second sol of 20 grams of pork skin gelatin, having its iso-electric point at pH 8, and 160 gm. of water is prepared, and this second sol is mixed with the emulsion. A volume of water is added to the mixture by spray over the period of one hour with constant stirring. All of the foregoing steps are carried out with the ingredients at 50° C. The resulting mixture is poured into water at 0° C., enough water being used to bring the total weight of ingredients to 3960 gm. The mixture is agitated and thereafter is allowed to stand for an hour at not over 6° C. The formation of the capsules is now complete. They can now be separated and washed with water. The pH is adjusted to 4 by adding 20% acetic acid and dried in a Niro spray dryer as described in Example 1. If it is desired to use the capsules as a coating material for paper, the dry encapsulated particles can be applied to the paper. Hardening by formaldehyde as in Example 5 can also be used in conjunction with the present procedure.

*Example 7*

Prepare a sol by dissolving 27.5 gm. of gum acacia into 170 ml. of water at 50° C. 2.75 ml. of 20% acetic acid is added to adjust the pH of the sol to 3.9.

233 milligrams of D. & C. Red No. 18 (1-xylylazo-2-naphthol) is dissolved in 46.5 ml. of acidic mineral oil at 50° C. to produce a 0.5% concentration of dye in the oil. The oil solution is combined with the acacia sol and emulsified four times in a hand homogenizer. A sol is prepared by dissolving 20 gm. of pork spin gelatin in 170 ml. of water at 50° C., and a sufficient amount of 20% acetic acid is added to adjust the pH to 3.9. The gelatin sol is added to the emulsion over a period of 30 minutes. 700 ml. of water previously heated to 50° C. is added to the emulsion over a period of 45 minutes. The material is maintained at 50° C. with stirring for 70 minutes. The mixture is cooled to 4° C. over a period of 30 minutes and maintained at this temperature with stirring for two hours. The pH of the mixture is then adjusted to 9.5 by the addition of 10% sodium hydroxide. 20 ml. of 30% glyoxal previously adjusted to pH 9.5 is added dropwise to the mixture. It is then stirred at 4° C. for 5 hours. A sufficient amount of 10% hydrochloric acid is added to adjust the pH to 5.0. The mixture is diluted to 4 liters with water. The sols are separated by centrifugation, washed with water and resuspended in 1 liter of water. The pH of the dispersion is checked and readjusted to 5 if necessary. The dispersion is spray dried in a Niro spray dryer as described in Example 1.

The foregoing procedure was repeated several times, keeping everything constant except the pH of the material before spray drying to determine its effect upon the permeability of the coating membrane of the dried product. In each case, the produce produced was dispersed in chloroform to determine its permeability. Since the gelatin-acacia coating is insoluble in chloroform, the chloroform contacts the oil through the pores of the coat, and the dye from the encapsulated oil diffuses out into the chloroform. Thus, under fixed experimental conditions the rate of diffusion of dye into the chloroform is a quantitative measure of the permeability of the coacervate membrane.

In the diffusion assay, 1 gm. of dry product was suspended in 250 ml. of chloroform and stirred at a fixed, constant rate. The rate of diffusion of the dye into the chloroform was measured spectrophotometrically on filtered aliquots of the chloroform suspension. The results are given in the following table. The diffusion rate is given as the amount of dye (expressed as percent of total amount of encapsulated dye) which is released per minute.

| pH of material prior to spray drying | Diffusion rate of dye (unit: percent dye released per minute) |
| --- | --- |
| 4.00 | 0.125 |
| 5.00 | 0.125 |
| 6.00 | 0.128 |
| 7.25 | 0.180 |
| 8.50 | 0.302 |

The data clearly show that adjustment of pH between 4 and 6 before spray drying produces a much more impermeable coating than that produced at higher pH's.

It is to be understood that the present invention is not to be limited to the exact compositions or methods shown and described as obvious modifications and equivalents will be apparent to one skilled in the art, and the invention is therefore to be limited only by the scope of the appended claims.

What is claimed is:

1. In the process of preparing a more impermeable coating by liquid-liquid phase separation, the step of spray drying the coacervate coating of a gelable hydrophilic colloid dispersed in an aqueous solution having a pH between about 4 and about 6.

2. The process of claim 1 wherein the process involves simple phase separation of gelatin as the hydrophilic colloid.

3. The process of claim 1 wherein the process involves complex phase separation including gelatin as the hydrophilic colloid and gum acacia as a second coating component.

References Cited in the file of this patent

UNITED STATES PATENTS 2,800,457    Green et al. _____ July 23, 1957